Nov. 16, 1965  W. HAMILTON  3,217,785
HATCH COVER SYSTEM
Filed Oct. 4, 1962  7 Sheets-Sheet 3

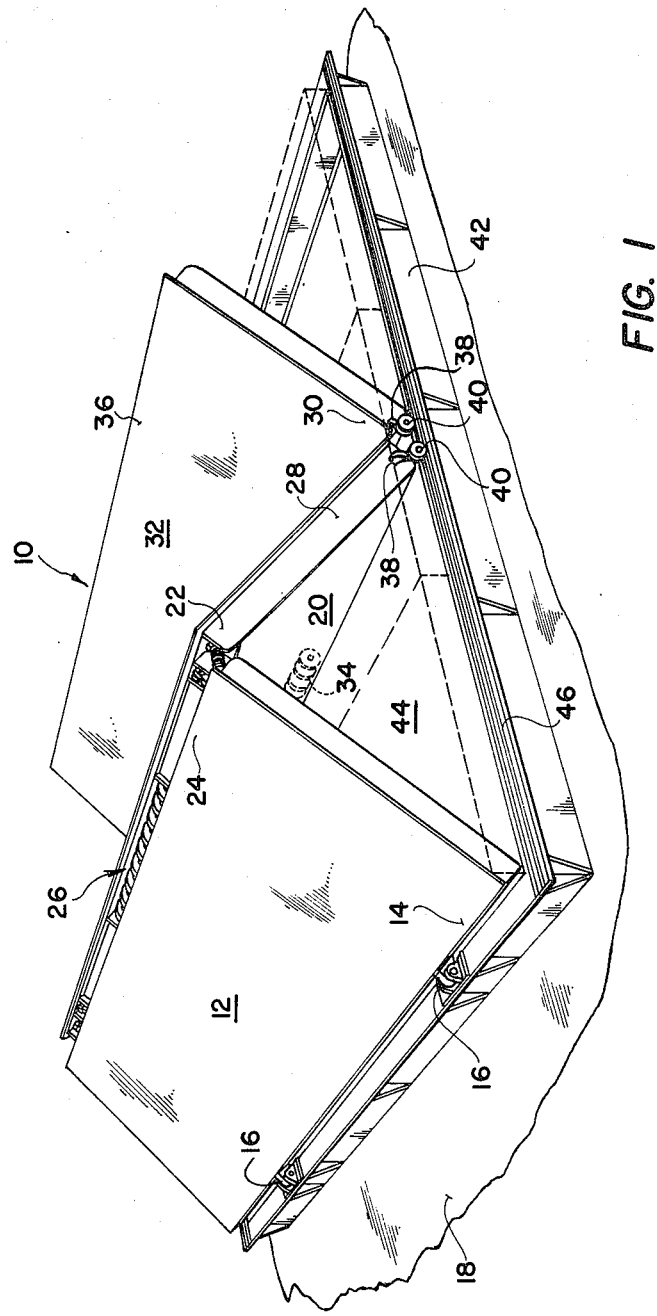

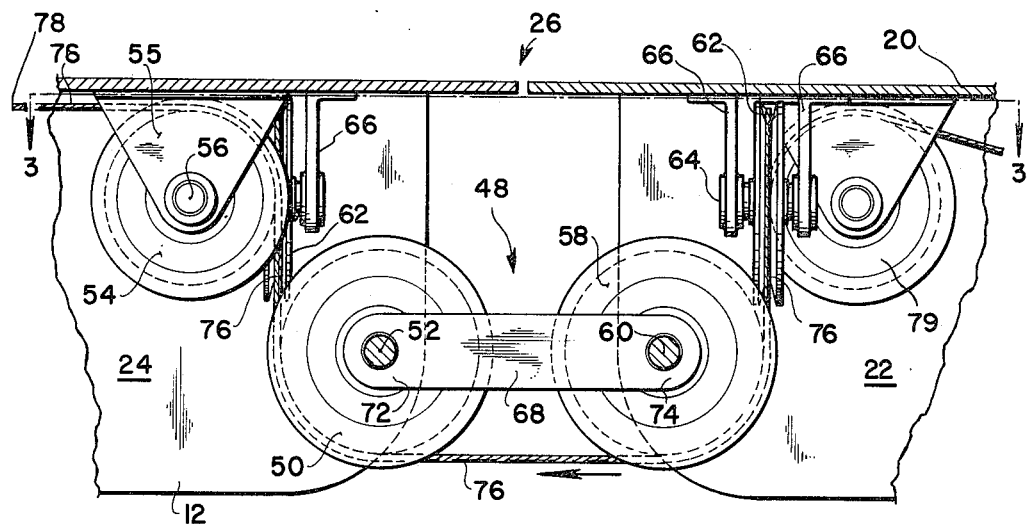

INVENTOR.
WALLACE HAMILTON
BY
ATTORNEY

United States Patent Office 3,217,785
Patented Nov. 16, 1965

3,217,785
HATCH COVER SYSTEM
Wallace Hamilton, Bentleyville, Ohio, assignor to PneumoDynamics Corporation, Cleveland, Ohio, a corporation of Delaware
Filed Oct. 4, 1962, Ser. No. 228,292
13 Claims. (Cl. 160—188)

This invention relates to power operated hatch cover systems for opening and closing hatchways provided in wagons, railroad cars or in the decks of vessels, such as ships or the like, and more particularly pertains to a new and improved hatch cover system and apparatus for collapsing and extending the panels of the hatch cover in opening and closing such hatchways.

To date, various systems and arrangements of hatch covers and apparatus for actuating same have been developed to improve the manipulation of the covers from an open to a closed hatchway position and vice versa. Such apparatus encompasses mechanical as well as hydraulic actuating apparatus involving complex and expensive units substantially increasing the costs of providing suitable covers for hatchways to protect cargo carried by the vessel. In instances where mechanically actuated hatch covers have been employed, the systems for opening and closing the hatchways have included complex linkage arrangements as well as apparatus, although simple in nature, requiring large forces to actuate the covers. Where vessels have been employed to carry cargo, such as grain or the like, hydraulic hatch covers have often damaged valuable cargo through leaks or breakage in the actuating apparatus of the covers resulting in oil spillage on the cargo itself. Further, the use of hydraulically actuated apparatus for manipulating the hatch covers has proved to be costly in installation as well as maintenance, since repair work requires competent personnel thoroughly familiar with the operation of the hatch cover system. The expense involved in repairs often becomes acute in instances where the vessels are in foreign ports lacking in qualified personnel to perform the needed repair work.

With the need for an improved design hatch cover system readily apparent from the problems encountered by the prior art systems the invention, described herein, is provided which obviates these problems and, accordingly, the objects of the invention are as follows:

It is an object of this invention to provide a new and improved power operated hatch cover system and actuating apparatus therefor, wherein a novel cable and pulley assembly comprises the actuating apparatus.

It is another object of this invention to provide a new and improved power operated hatch cover system and actuating apparatus therefor, wherein the novel pulley and cable assembly is operable in odd and even numbered panel arrangements of hatch covers.

It is a further object of the invention to provide a new and improved power operated hatch cover system and actuating apparatus therefor, wherein the novel pulley and cable assembly comprises a multiplicity of pulleys and a single cable operable to actuate a single or a series of panels forming the hatch cover arrangement.

A still further object of this invention is to provide a new and improved power operated hatch cover system and actuating apparatus whereby a standard source of power utilized by vessels can be employed to operate the apparatus eliminating the need for large operator control stations occupying valuable weatherdeck space.

It is another further object of this invention to provide a new and improved power operated hatch cover system and actuating apparatus therefore, wherein the novel apparatus is simple in design, fast and efficient in operation and involves inexpensive installation in new as well as existing hatch cover panel arrangements on vessels.

These and other objects and important features of the invention will be apparent from a study of the specification following taken with the drawing which together show, illustrate, describe and disclose the preferred embodiment or modification of the invention and what is now considered to be the best mode of practicing the principles thereof. Still other embodiments or modifications of the invention may be suggested to those having the benefit of the teaching herein, and all such embodiments or modifications are intended to be reserved as they fall within the spirit and scope of the subjoined claims.

In the drawing:

FIGURE 1 is a perspective view of a hatch cover arrangement embodying the novel panel actuating apparatus shown in a partially collapsed position.

FIGURE 2 is an enlarged side elevational view partly in cross-section of the hatch cover actuating apparatus illustrating the novel pulley and cable assembly at a pivotal connection between two panels of the hatch cover arrangement.

FIGURE 3 is an enlarged top view partly in cross-section of the novel pulley and cable assembly taken along lines 3—3 of FIGURE 2.

Figure 4:
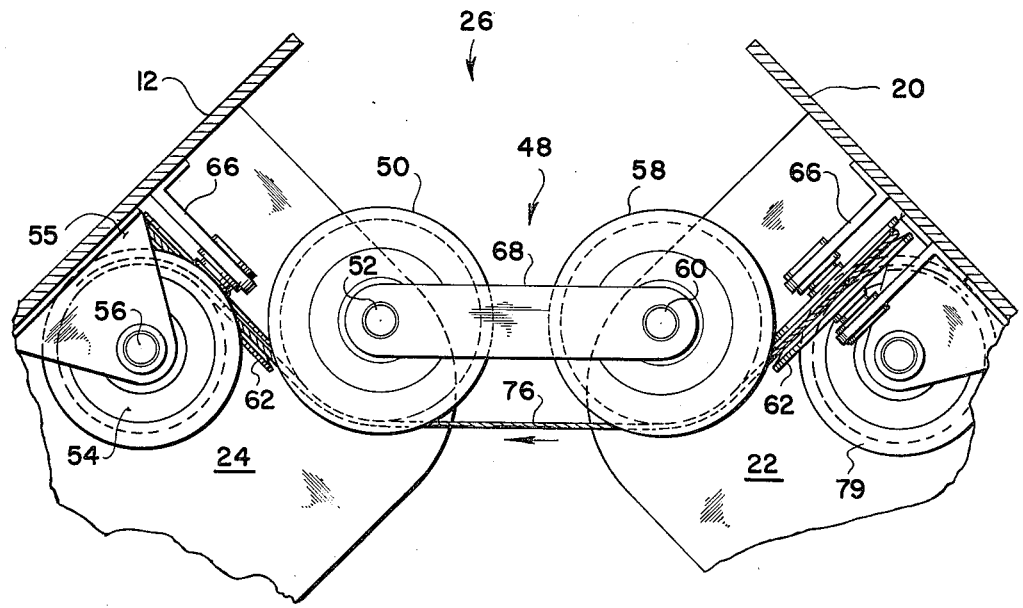
FIGURE 4 is an enlarged side elevational view partly in cross-section of the novel pulley and cable assembly illustrating two panels of the hatch cover arrangement in a partially collapsed position during the opening of the hatchway.

Attention is now directed to the drawing wherein a system for opening and closing a three panel hatch cover over a ship's hatchway is illustrated wherein the hatch cover arrangement 10 comprises a first panel 12 having one end 14 thereof pivotally mounted by suitable means such as a hinge 16 to a portion of the deck 18 of the vessel (not shown). A second panel 20 is fixed at one end portion 22 thereof to one end 24 of the first panel 12 to form a pivotal connection 26 therebetween. The other end portion 28 of the second panel 20 is fixed to one end portion 30 of a third panel 32 to form a second pivotal connection 34 therebetween. The end portion 36 of the third panel 32 is free to pivot about the pivotal connection 34 in a manner to be hereinafter described. The second and third panels 20 and 32 respectively are provided with roller support arms 38 and rollers 40 journalled thereon to support the panels above the hatchway during the extending and collapsing operations of the hatch cover assembly. It is to be understood that similar arms 38 and rollers 40 are provided on both sides of the panels even though a single side of the panels is disclosed in FIGURE 1. A hatchway coaming 42, which encompasses the hatchway opening 44, is provided with a suitable track 46 to engage the rollers 40 on the support arms 38 when the hatch cover is actuated through the panel extending and collapsing operations. The coaming 42 further functions, in cooperation with the panels, to prevent the entrance of sea water or other foreign objects into the hold of the vessel when the panels are in an extended substantially horizontal position. Phantom lines of FIGURE 1 illustrate the panels in an extended substantially horizontal position when the hatchway is closed and the panels are in engagement with the coaming 42.

The pivotal connection 26 (FIGURE 2) comprises a multiplicity of pulley assemblies 48, the purpose of which will become apparent later on in the description, however, for reasons of clarity and brevity, the structural relationship of the elements in a single pulley assembly is set forth. The end portion 24 of the first panel 12 is provided with a main pulley 50 rotatably mounted on a shaft 52 extending transversely in the first panel 12 and fixed thereto to form the pivotal axis of the first panel 12 for movement about the pivotal connection 26. A guide pulley 54 is rotatably mounted on a shaft 56 fixed to the end portion 24 of the first panel 12 by suitable brackets 55 and laterally disposed from the main pulley 50. The shaft 56 of the guide pulley 54 extends in a direction parallel to the shaft 52 of the main pulley 50 with the guide pulley 54 being disposed in co-planar relationship with the main pulley 50. The end portion 22 of the second panel 20 is provided with a main pulley 58 disposed in co-planar relationship with the main pulley 50 and rotatably mounted on a shaft 60 fixed to the end portion 22 of the second panel 20. The shaft 60 forms the pivotal axis of the second panel 20 for movement thereof about the pivotal connection 26. An idler pulley 62 is laterally disposed from the pulley 58 and is rotatably mounted on a shaft 64 fixed to the end portion 22 of the second panel 20 by suitable brackets 66. The shaft 64 of the idler pulley 62 is disposed in a direction normal to the shaft 60 and, accordingly, positions the idler pulley 62 in a vertical plane passed normal to the plane of the main pulleys 50 and 58. A pair of drag links 68 and 70 have one end portion 72 thereof connected to the shaft 52 and the other end portion 74 thereof connected to the shaft 60 forming a fixed connection between the first and second panels 12 and 20 respectively laterally spacing the centers of rotation of the pulleys 50 and 58 and the corresponding pivotal axes of the panels 12 and 20 respectively about the pivotal connection 26. Each of the pulleys is provided with suitable grooves to receive a cable 76 therein threaded about the pulleys 54, 50, 58 and 62 in the manner illustrated in FIGURE 2 wherein one end portion 78 of the cable 76 is suitably fixed to a power source (not shown) such as a winch or the like operable upon actuation to produce a tensile load on the cable to pull the cable in the direction shown in FIGURE 2.

Figure 5:
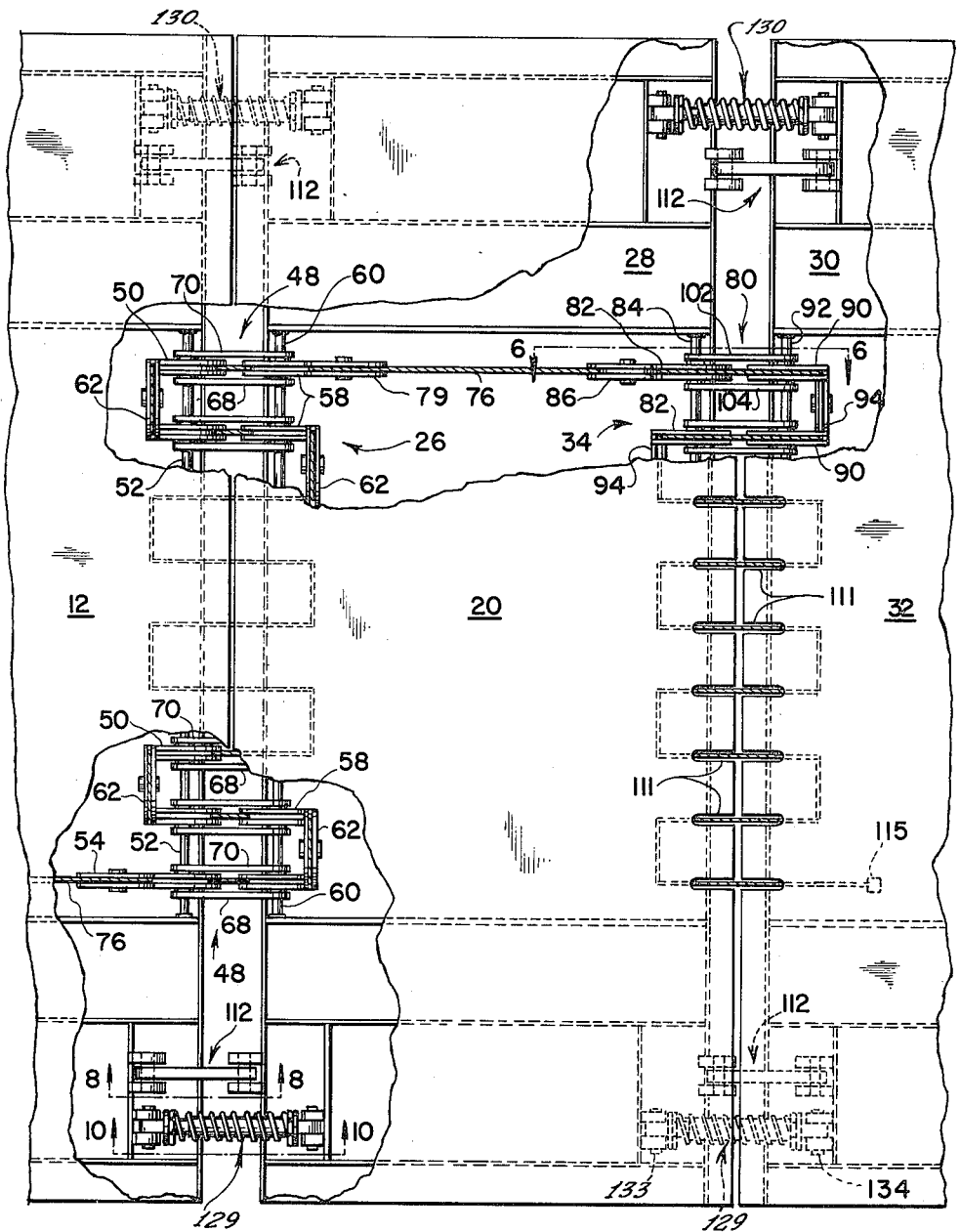
FIGURE 5 is a top view partly in cross-section of the novel pulley and cable assembly illustrating therein the structural location of the hatch cover actuating apparatus for the three panel hatch cover arrangement of FIGURE 1.

The pivotal connection 26 comprises a multiplicity of main pulleys 50 and 58 and idler pulleys 62 mounted on shafts 52, 60 and 64 respectively in a series arrangement for receiving the cable 76 thereaabout in the manner illustrated in FIGURES 3 and 5. The main pulleys 50, disposed on the end portion 24 of the first panel 12, are axially spaced from one another and have a common axis of rotation coincident with the pivotal axis of the first panel 12 provided by the shaft 52. Similarly, the main pulleys 58 in the end portion 22 of the second panel 20 are axially spaced from one another along a common axis of rotation with their axes of rotation being coincident with the pivotal axis of the second panel 20 formed by the shaft 60. The idler pulleys 62 on panels 12 and 20 are laterally spaced from one another whereby their axes of rotation provided by the shafts 64 are disposed parallel to one another. The idler pulleys 62 are fixed to the end portions 24 and 22 of the first and second panels 12 and 20 respectively and are alternately disposed with respect to the positioning of the set of main pulleys 50 and 58 in the first and second panels 12 and 20 respectively such that the direction of movement of the cable 76 during the collapsing and opening movement of the panels is reversed in each adjacent set of main pulleys by the idler pulleys 62. A second guide pulley 79 is provided in the pivotal connection 26 (FIGURE 5) which functions to direct the cable to the adjacent pivotal connection. The specific advantage for this arrangement of the main and idler pulleys will become more apparent from a detailed description of the operation of the hatch cover arrangement set forth hereinafter.

The second pivotal connection 34 (FIGURE 6) between the second and third panels 20 and 32 respectively is similar to the pivotal connection 26 and comprises a multiplicity of pulley assemblies 80, the purpose of which will become more apparent later on in the description, however, for reasons of clarity and brevity, the structural relationship of the elements in a single pulley assembly is set forth. The pulley assembly 80 (FIGURE 6) comprises a main pulley 82 rotatably mounted on a shaft 84 fixed to the second panel end portion 28. The shaft 84 forms the pivotal axis of the second panel 20 for movement about the pivotal connection 34. A guide pulley 86 is laterally spaced from the main pulley 82 and rotatably mounted on a shaft 87 and fixed by suitable brackets 89 to the panel end portion 28 located below the axis of rotation of the main pulley 82 substantially adjacent the portion 88 of the second panel 20 in engagement with the coaming 42 when the hatch cover is in an extended position upon closing of the hatchway 44. The guide pulley 86 is disposed in co-planar relationship with the main pulley 82 whereby the shafts 84 and 87 are positioned parallel to one another. The end portion 30 of the third panel 32 is provided with a main pulley 90 rotatably mounted on a shaft 92 fixed to the end portion 30 of the third panel 32 wherein the main pulley 90 is laterally spaced from the main pulley 82 in the end portion 28 of the second panel 20 and disposed in co-planar relationship therewith. An idler pulley 94 is rotatably mounted about a shaft 96 fixed to the third panel 32 by suitable brackets 98 and disposed laterally below the shaft 92 at a position on the third panel 32 adjacent a portion 100 of the third panel 32 which engages the hatch coaming 42 when the panels are in an extended position upon closing of the hatchway. The shaft 92 provides the pivotal axis of the third panel 32 for movement thereof about the second pivotal connection 34. The idler pulley shaft 96 is disposed normal to, the main pulley shaft 92 and correspondingly positions the idler pulley 94 in a vertical plane drawn normal to the plane of the main pulleys 82 and 90. The main pulleys 82 and 90 are situated in the second and third panels 20 and 32 respectively in the identical manner as the main pulleys 50 and 58 are disposed at the pivotal connection 26. The guide and idler pulley 86 and 94 arrangement differs from the first pivotal connection 26 in that their axes of rotation provided by the shafts 87 and 96 respectively are disposed beneath the axes of rotation of the main pulleys 82 and 90 respectively. A pair of drag links 102 and 104 are fixed at their end portions 106 and 108 to the shafts 84 and 92 respectively, to laterally fix the centers of rotation of the pulleys and the pivotal axes of the second and third panels 20 and 32 provided by the shafts 84 and 92 respectively relative to one another.

Figure 6:
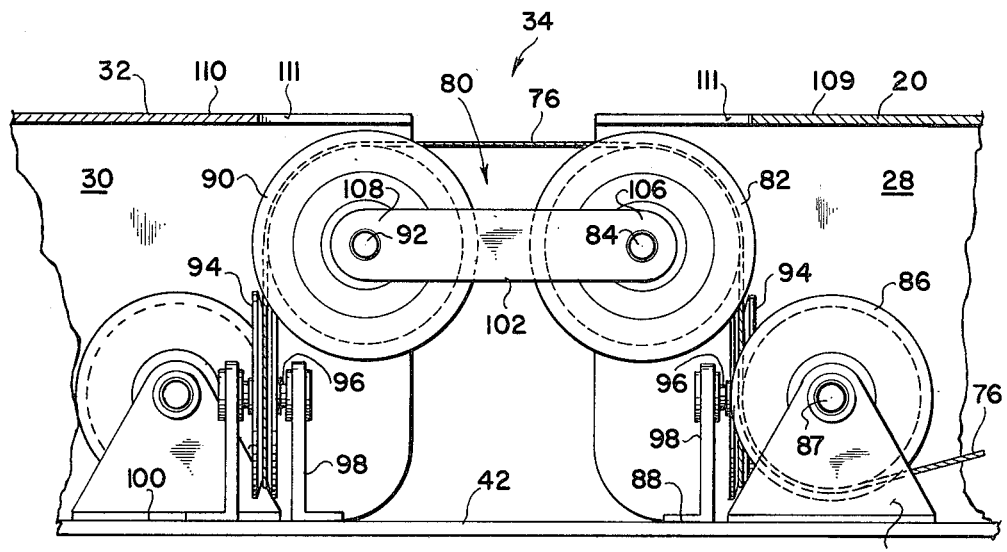
FIGURE 6 is an enlarged side elevational view, partly in cross-section of the novel pulley and cable assembly taken along lines 6—6 of FIGURE 5 illustrating the pivotal connection between the end panel and the intermediate panel of the three panel hatch cover arrangement of FIGURE 1.

The cable 76 is thus threaded through the pulleys 86, 82, 90 and 94 respectively in the manner illustrated in FIGURE 6 of the drawing. In the panel surface portions 109 and 110 at the end portions 28 and 30 of panels 20 and 32 respectively, a multiplicity of slots 111 are provided therein equal in number to the sets of main pulleys 82 and 90 utilized in the pivotal connection 34. The purpose of the slots 111 will be discussed hereinafter in the description of the operating cycle of the hatch cover assembly.

The pivotal connection 34 between the second and third panels 20 and 32 respectively comprises a multiplicity of main pulleys 82 and 90 and idler pulleys 94 mounted on shafts 84, 92 and 96 respectively in a series arrangement for receiving the cable 76 thereabout in the manner illustrated in FIGURES 5 and 6. The main pulleys 82 disposed on the end portion 28 of the second panel 20 are axially spaced from one another and have a common axis of rotation coincident with the pivotal axis of the second panel 20 provided by the shafts 84. Similarly, the main pulleys 90 in the end portion 30 of the third panel 32 are axially spaced from one another along a common axis of rotation with their axes of rotation being coincident with the pivotal axis of the third panel 32 formed by the shafts 92. The idler pulleys 94 are fixed to the end portions 28 and 30 of the second and third panels 20 and 32 respectively and are alternately disposed with respect to the positioning of the co-planar main pulleys 82 and 90 in the second and third panels 20 and 32 respectively such that the direction of movement of the cable 76 during the collapsing and opening movement of the panels is reversed, in each adjacent set of main pulleys by the idler pulleys 94. The specific advantage for the multiplicity of main and idler pulleys will become more apparent from a detailed description of the operation of the hatch cover arrangement set forth hereinafter.

Figure 13:
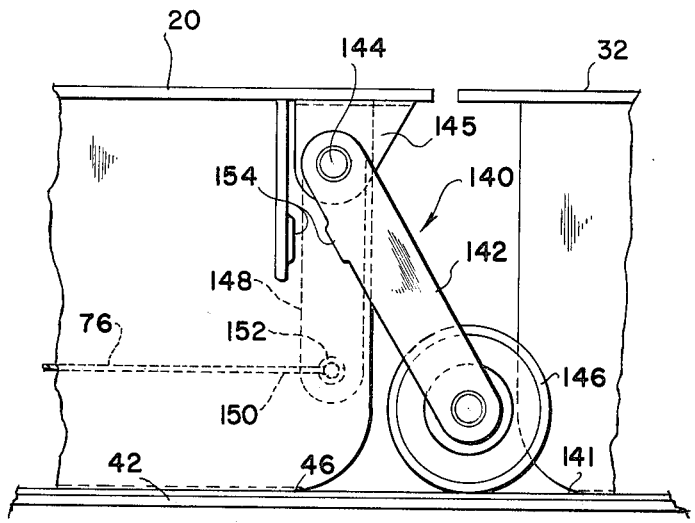
FIGURE 13 is an enlarged side elevational view, partly in cross-section of a jacking mechanism for lifting the hatch cover off of the hatchway coaming upon initial movement of the actuating apparatus.

The overall arrangement of the panels in the assembly and the actuation apparatus therefore is more clearly illustrated in FIGURE 5 of the drawing, wherein the cable 76 is directed from the last pair of main pulleys of the pulley and cable assembly 48 at the pivotal connection 26 to the guide pulley 79 over to the guide pulley 86 at the pivotal connection 34 formed between the second and third panels 20 and 32 respectively. The cable 76 is then threaded through the pairs of main pulleys 82 and 90 and idler pulleys 94 in the manner illustrated in FIGURE 5 whereupon the cable can be dead ended by suitable means at a point 115 on the third panel 32 or directed to the jacking mechanism (FIGURE 13) to be discussed hereinafter in detail.

It is to be understood that the pulley and cable assembly provided at the pivotal connection 26 between a pair of panels such as the first and second panels 12 and 20 respectively, is suitable for all panel actuating pivotal connections in a batch cover arrangement comprising even numbered or pairs of panels. The panel actuating pivotal connections between pairs of adjacent pairs of panels in an even numbered panel arrangement would be similar to the assembly illustrated in FIGURE 2 of the drawing. In any odd numbered panel arrangement of a hatch cover assembly, the pivotal connection between the end panel and adjacent panel thereto in each such arrangement will comprise a pulley and cable assembly identical with the pivotal connection 34 illustrated in FIGURE 6 of the drawing. Therefore, it can be readily seen that the number of panels required in any hatch cover assembly will have no effect in the structural arrangement of the illustrated panel actuation pivotal connections 26 and 34 between the panels.

Figure 8:
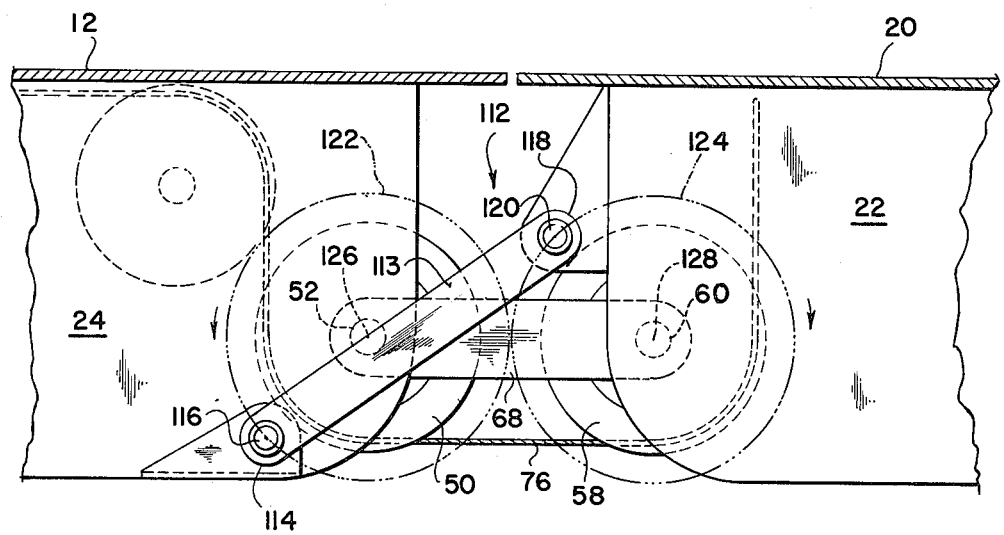
FIGURE 8 is an enlarged side elevational view partly in cross-section of the end portions of the panels taken along lines 8—8 of FIGURE 5 illustrating therein a stabilizing link utilized between adjacent panels of the hatch cover arrangement.
Figure 9:
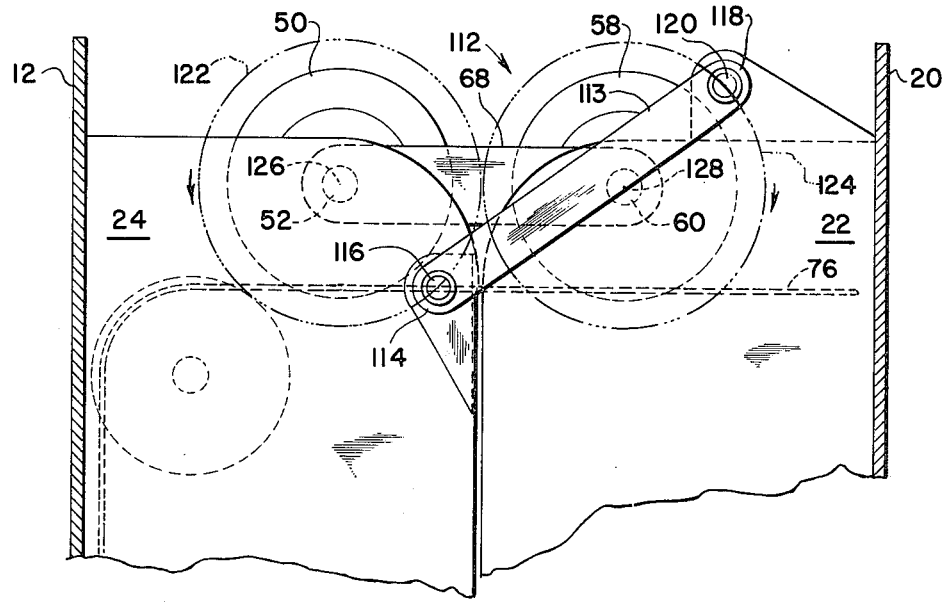
FIGURE 9 is an enlarged side elevational view, partly in cross-section, of the stabilizing linkage and panel arrangement shown in FIGURE 8 illustrating the position of a stabilizing link when the panels are in a collapsed position during the uncovering operation of the hatchway.
Figure 11:
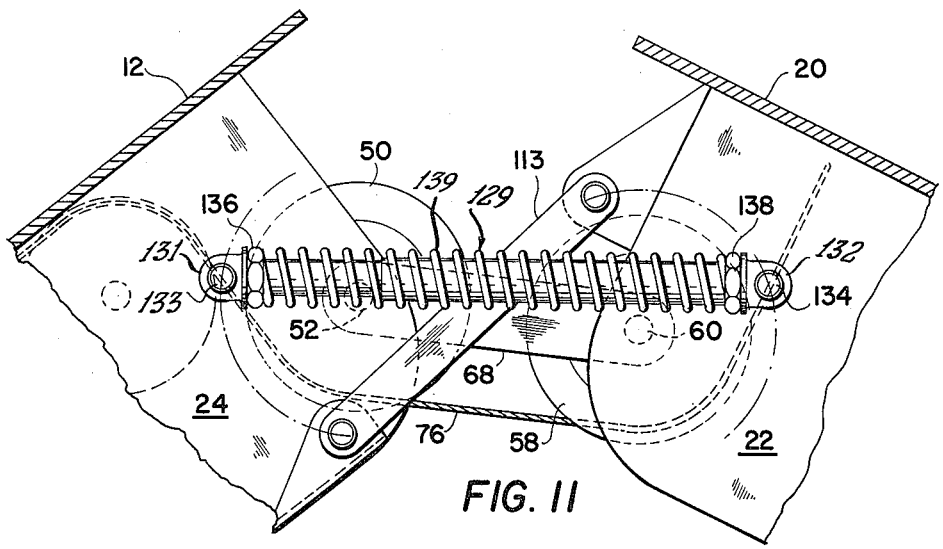
FIGURE 11 is an enlarged side elevational view partly in cross-section of the spring and panel arrangement of FIGURE 10 illustrating therein the position of the spring when the panels are in the partially collapsed position.

At the end portions between adjacent panels, stabilizing linkage 112 (FIGURE 8) is provided for preventing panel wobble and cocking motion during the collapsing and extending movement thereof as well as the completely collapsed position. The stabilizing bar 113 (FIGURES 8 and 9) is pivotally mounted at one end portion 114 thereof to a pin 116 fixed to the end portion 24 of the first panel 12 with the other end portion 118 thereof pivotally mounted on a pin 120 fixed to the end portion 22 of the second panel 20. It is to be understood that the stabilizing bar arrangement is provided between all adjacent panels in the hatch cover arrangement shown but, in hatch cover arrangements where pairs of panels are employed as in the case of odd numbered panel arrangements comprising 5, 7 or more panels as well as even numbered panels, the stabilizing bar is primarily utilized at the pivotal connection of each pair of panels. For purposes of brevity, however, the operation of a single stabilizing linkage will be described. The pins 116 and 120 fixed to the panels 12 and 20 respectively, are disposed in a predetermined spaced relationship with respect to one another in that, the pins 116 and 120 comprise points when moved in an arcuate manner define loci of points forming circles 122 and 124 (dotted lines, FIGURES 8 and 9) disposed tangent to one another and having their origins 126 and 128 respectively, at each panel pivotal axis formed by the shafts 52 and 60 respectively. During the collapsing movement of the panels (FIGURE 9) the pin 116 will rotate through an arc of the circle 122 in a counter-clockwise direction while the pin 120 rotates through an arc of the circle 124 in a clockwise direction. To permit continued collapsing movement of the panels in view of the fixed distance between the pins 116 and 120, the drag links 68 and 70 will pivot about their respective shafts 52 and 60 (FIGURE 11). This movement of the drag links occurs in reaction to the tensile load on the bar 113 created by the pivoting panels 12 and 20. Accordingly, the panels 12 and 20 collapse in a non-symmetric manner as shown in FIGURE 11. In particular, the adjacent panels 12 and 20, when in the completely collapsed position, comprise an unstable four-bar linkage arrangement capable of oscillating movement about the hinge 16 and the rollers 40 on the track 46 of the coaming 42. The disposition of the stabilizing bar in the collapsed position of the panels to form an angle with respect to the drag links 68 and 70 (FIGURE 9) thereby prevents oscillation of the panels about the hinges 16 and the rollers 40.

To aid in the panel collapsing and extending movement of the hatch cover arrangement, pairs of coil spring assemblies 129 and 130 (FIGURES 5 and 10 through 12) are provided between all adjacent panels. It is to be understood that each of the panels is provided with actuating springs disposed therebetween, however, in hatch cover arrangements where pairs of panels are employed as in the case of odd numbered panel arrangements comprising 5, 7 or more panels as well as even numbered panels, the pairs of coil springs are primarily utilized at the panel actuating pivotal connection of each pair of panels. For the purpose of brevity, the operation of a single spring assembly 129 will be discussed hereinafter in detail. The end portions 131 and 132 of the spring assembly 129 are fixed to the end portions 24 and 22 of the adjacent panels 12 and 20 respectively by securing pins 133 and 134 respectively. Adjusting mechanisms 136 and 138 are provided at the end portions 131 and 132 respectively of a coil spring 139 to facilitate preloading of the spring to a predetermined amount. In the panel extended position (FIGURE 10) the securing pins 133 and 134 on the panels 12 and 20 respectively, are in substantial axial alignment with respect to one another parallel to a horizontal plane defined by the hatch cover panels and laterally disposed above the panel pivotal axes provided by the shafts 52 and 60. During the collapsing movement of the panels, the securing pins 133 and 134 rotate in opposite directions defining arcs having the origin of their radii of curvature at the shafts 52 and 60 respectively disposing the spring 139 in an extended position whereby the preloading thereof is substantially reduced (FIGURE 11). At the completely collapsed position (FIGURE 12) of the panels, the securing points 133 and 134 are located below the shafts 52 and 60, and, such movement of the panels compresses the coil spring 139 to reload same.

Figure 10:
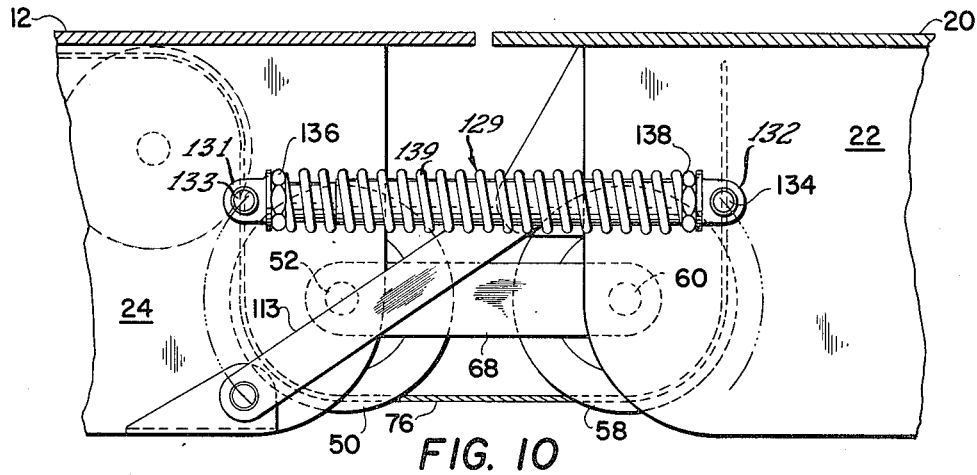
FIGURE 10 is an enlarged side elevational view, partly in cross-section, of the end portions of adjacent panels in the hatch cover arrangement taken along lines 10—10 of FIGURE 5 illustrating therein a spring and panel arrangement utilized to supplement the hatch cover actuating apparatus during the initial extending and collapsing operation of the panels in the hatch cover arrangement.
Figure 12:
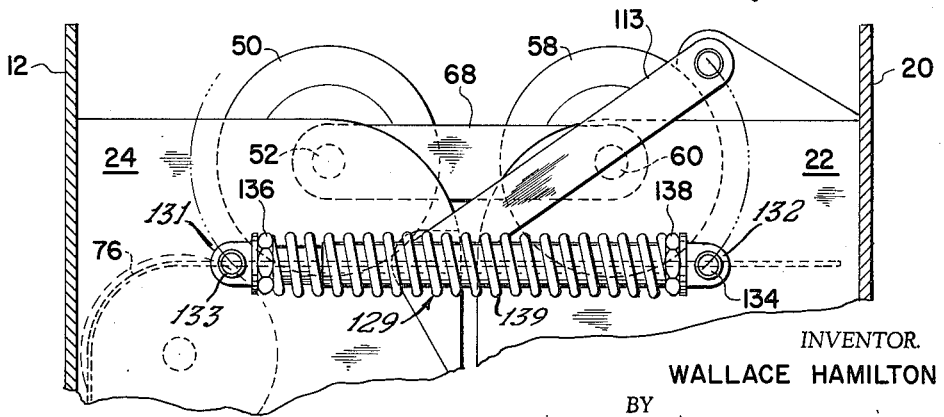
FIGURE 12 is an enlarged side elevational view of the spring and panel arrangement of FIGURE 10, illustrating therein the disposition of the spring with respect to the panels when the panels are in the completely collapsed position.

Between the second and third panels 20 and 32, the coil spring assemblies 129 and 130 (FIGURE 5) have their end portions secured to suitable pins 133 and 134 which are disposed below the shafts 82 and 90 in the pivotal connection 34 when the panels 20 and 32 are in the extended position. The manner of operation of the springs secured to panels 20 and 32 during the collapsing movement of the panels is similar to the spring operation between panels 12 and 20 hereinabove set forth, however, the sequence in movement of the springs as illustrated in FIGURES 10, 11 and 12 from the panel extended to the collapsed position is reversed. The loading and unloading of the springs 139 produced by the movement of the panels, is operable to provide additional lifting forces during the initial collapsing movement of the covers and aids in the initial extending movement of the panels during the hatchway closing operation of the hatch covers. It can be readily seen that the amount of preloading in the coil spring 139 is dependent upon the particular location of the spring ends on the panels with respect to their collapsed and extended positions. In hatch cover arrangements where the number of panels are large, the collapsing and extending movements result in some panels collapsing prematurely or at a slow rate causing excessive delay in the manipulation of the cover. The coil spring can be effectively utilized to control the sequence of movement of the panels by varying the preloading thereof and selectively disposing the end portions of the spring about the respective pivotal axes of the adjacent panels in the pivotal connection.

In hatch cover systems where a seal is provided for engagement with the coaming, a mechanism is desirable which will, upon actuation, lift the assembly from the coaming in a manner to prevent the occurrence of damage to the seal. Where a seal 141 is provided and is attached to the hatch cover assembly (FIGURE 13), collapsing and extending movement of the panels generally results in damage to the seal, substantially reducing its life expectancy. To obviate the occurrence of this damage, a pair of jacking mechanisms 140 (one shown) are provided in the hatch cover system comprising support arms 142 located externally of the panel 20 and fixed to a laterally extending shaft 144 disposed in the second panel 20. The shaft 144 is secured to panel 20 by suitable brackets 145. The support arms 142 have support rollers 146 journalled thereon engaging the track 46 on the coaming 42. A bar 148 is fixed to the shaft 144 and is disposed on the shaft intermediate the support arms 142. The cable 76 extending from the pivotal connection 34, in the absence of dead ending same to the third panel 32, is fixed at its end portion 150 to the bar 148 at point 152. Tension applied to the cable 76 at the initial collapsing movement of the hatchway opening will pivot the bar 148 about the shaft 144 developing a moment about the shaft 144 causing the support arms 142 to pivot downward about the axis of the shaft 144. This movement of the support arms 142 results in the engagement of the rollers 146 with the track 46. As the cable tension is increased, the net result of the downward force applied to the support arms 142 and in turn the support rollers 146 causes the pivotal connection 34 to move upwardly and pivot the end portions 28 and 30 of panels 20 and 32 respectively about the hinge 16 between the deck 18 and the first panel 12. The amount of upward movement of the panels is controlled by stops 154 to prevent damage to the panels. In providing a suitable jacking mechanism, the amount of cable pull to pivot the arms 142 is designed to be less than the pull necessary to raise the respective panels and, accordingly, the panels will be lifted from the coaming before the pivotal connections are actuated.

Figure 7:
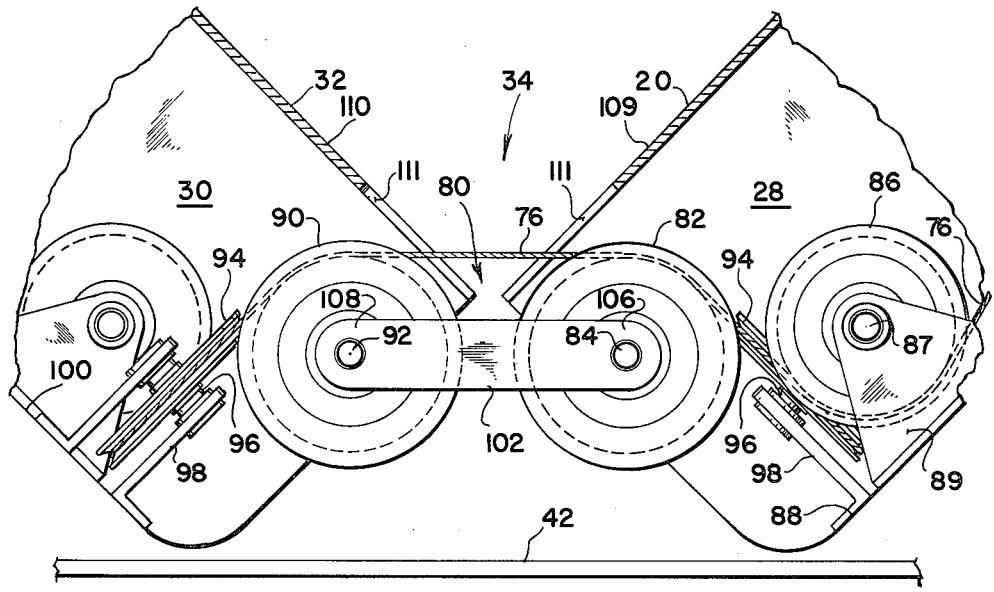
FIGURE 7 is an enlarged side elevational view, partly in cross-section, of the novel pulley and cable assembly illustrating therein the end panel and the intermediate panel arrangement of FIGURE 6 in a partially collapsed position occurring during opening of the hatchway.

In order to more fully and completely understand the novel concept disclosed herein, a typical operating cycle of the hatch cover system will be described in detail. When the hatch cover assembly 10 is in an extended position and opening of the hatchway is desired, tension is applied to the cable 76 by the power source (not shown) causing the following reaction: At the pivotal connection 26, the main pulleys 50 and 58 rotate in the direction indicated (FIGURE 4) through an arc of 90° developing moments about the shafts 52 and 60 respectively. These moments developed about the shafts 52 and 60 and in turn the hinge point of the adjacent panels which is co-planar with their pivot points can be computed by the amount of tension in the cable times the radius of the pulleys 50 and 58. The hinge point of the adjacent panels is determined by the intersection of the planes of the stabilizer bar and drag links and in the instant embodiment such point moves along the drag link length responsive to the pivot movement of the panels. Accordingly, the moment arm length is equal to the radius of the pulleys 50, 58, 82 and 90, since the axis of rotation of the pulleys is co-planar with the hinge point of the adjacent panels. Since panel 12 is hinged at point 16, the torque developed by the cable and main pulleys 50 and 58 about the hinge point and reacted to by the panels at the engagement thereof with the coaming causes the panels at the pivotal connections 26 between the panels 12 and 20 to lift upwardly and begin pivoting about their respective shafts 52 and 60. Simultaneously, with the upward movement of the pivotal connection 26, the main pulleys 82 and 90 in the pivotal connection 34 rotate through a 90° arc in the direction shown in FIGURE 7 developing moments thereabout equal to the radius of the pulleys times the cable tension force and reacting on the drag links 102 and 104 respectively. Since the end portion 30 of the third panel 32 is free, the reaction of the drag links 102 and 104 to the torque developed by the main pulleys 90 results in the pivoting of the third panel about the pivotal axis provided by the shaft 92. Due to the arrangement of the main pulleys 82 and 90 with respect to the end portions 28 and 30 or panels 20 and 32 respectively, the panel collapsing movement causes the panels to pivot about their respective shafts 84 and 92 whereby the cable 76 is received in the slots 111 formed in the panel surface portions 109 and 110. The slots 111 therefore are provided to eliminate contact of the panels with the cable 76 in the manner illustrated in FIGURE 7. The combined pivotal movement of the panels results in the collapsing of the panels in the manner illustrated in FIGURES 4 and 7. When closing of the hatchway is desired, the tension in the cable 76 is released allowing the springs 139 to expand to initiate the extending movement of the panels and permit gravity to return the covers through the reversal of the direction of rotation of the main pulleys at the pivotal connections 26 and 34 and through the rolling engagement of the support rollers 40 with the track 46 to the horizontally disposed position. The tension in the cable 76 is gradually released so that the return of the panels is accomplished in a manner preventing damage to the cover which would occur if the cable tension was released in its entirety.

Along with the torque developed by the cable and main pulleys at the pivotal connection, additional lifting forces are provided in the form of force couples between the guide and main pulleys and the idler and main pulleys at each panel end portion. The particular magnitude of these forces at given conditions can be readily computed by one skilled in the art upon an analysis of the cable and pulley assembly.

The amount of cable take-up can be readily computed by determining the circumference of each pulley and the arc through which the pulley travels upon rotation responsive to the pull of the cable. The length of the arc of pulley travel equals the amount of cable take-up for each pulley and in the instance of the pair of pulleys, disclosed in FIGURE 4, is equivalent to one-half of the circumference of a pulley. It is possible when operating on the above stated principle, that a single pair of pulleys be provided at each pivotal connection where the cable is dead ended at the idler pulley 94, however, in such an arrangement, the panels would require a large tensile force on the cable to accomplish the collapsing movement in the hatch opening operation. To decrease the required force on the cable, additional pairs of pulleys are provided (FIGURES 3 and 5) resulting in a distinct mechanical advantage. For example, two pairs of pulleys will reduce the required lifting force by one-half. Additional pairs of pulleys will further reduce the required tensile force on the cable by a proportional amount. Accordingly, the amount of cable take-up can be readily determined by properly computing the number of pulleys for a desired specific cable tension and adding the linear length of the 90° arc of travel by each pulley to give the total amount of cable take-up. It is important to note that in the collapsing and extending operations of the covers, each pair of pulleys will rotate a total of 180° from the completely extended position to the completely collapsed position.

The above calculations have been provided to exemplify the type of computation encountered by one skilled in the art, in determining the number of pairs of pulleys proportional to the weight of the hatch cover panels and the desired or available cable tension. It can be readily seen that the calculations are simple, therefore, facilitate promp determination of the required structure for panels of various weights and available means for applying load to the cable.

While the invention has been described, disclosed, illustrated and shown in terms of the preferred embodiment or modification which it has assumed in practice, the scope of the invention should not be deemed to be limited by the precise embodiment or modification as herein described, disclosed, illustrated and shown, since other embodiments and modifications are intended to be reserved where they fall within the scope of the claims herein appended.

I claim as my invention:

1. In a cover system for ship hatchways and the like, first and second adjacent structural cover sections supported for movement, connecting means interconnecting said first and second sections, pulleys respectively associated with said sections and being carried on said sections in the region of their adjacent edges with said pulleys being mounted for rotation on axes in laterally spaced relation within a plane below the top surface of the sections when in an extended horizontal condition, actuating means operative between said sections and cooperable with said pulleys to provide upon actuation said movement of said sections between said extended substantially horizontal condition and a folded vertical condition, respectively, for closing and opening the hatchway and the like, said actuating means including a cable guided from a point on one of said cover sections above said plane and about the lower portions of said pulleys to a point on the adjacent cover section also above said plane, means for applying tension to said cable, whereby tensioning of the cable between such points, respectively, on the sections tends to lift the pulleys, and hence the cover sections at such region of adjacency.

2. A cover system as set forth in claim 1 wherein a further structural section is included adjacent an outer edge of one of the first and second sections, and said further section and the section adjacent thereto are provided with pulleys also cooperable with said actuating means to provide relative movement as well of said further section.

3. A cover system as set forth in claim 2 wherein the pulleys associated with the further section and the section adjacent thereto are mounted for rotation on horizontal axes below the top surfaces of the sections, and the cable is guided over the upper portions of these pulleys from points respectively on the further and adjacent sections below said axes, whereby tensioning of the cable tends to move the pulleys downward to effect the relative movement between these sections.

4. In a cover system for ship hatchways and the like, first and second adjacent structural sections, connecting means interconnecting said first and second sections at adjacent ends thereof for relative movement, pulley assembly means in part mounted on said first section at its adjacent end and in remaining part mounted on said second section at its adjacent end, and actuating means operatively associated with said pulley assembly means commonly cooperable therewith to actuate the sections for relative movement thereof.

5. The combination of claim 4 wherein each of said pulley assembly means comprises a main pulley, an idler pulley and a guide pulley mounted at the adjacently disposed end of each of said first and second sections, and said actuating means comprising a single cable passing around each of said pulleys.

6. The combination of claim 5 wherein said pulleys are located beneath the top surfaces of said sections.

7. The combination of claim 4 further including a multiplicity of such pulley assembly means extending across substantially the entire width of the section thereby uniformly to apply the opening or closing force to the sections across substantially their entire width.

8. The combination of claim 4 further including resiliently deformable means interposed between said first and second sections, said resiliently deformable means being compressed during movement of said sections in one direction and operable to assist return movement thereof in the opposite direction.

9. The combination of claim 4 wherein said connecting means interconnecting said first and second sections comprises a plurality of connecting links pivotally connected at opposite ends to the adjacent ends of said first and second structural sections.

10. The combination of claim 4 wherein said connecting means includes stabilizing means for maintaining substantially uniform application of force on said sections during movement thereof, said stabilizing means comprising a pair of linking bars, each of which is operatively connected at opposite ends thereof to said first and second structural sections.

11. A cover system for ship hatchways and the like comprising a plurality of hatch cover panels movable between a closed, substantially horizontal position and an open, substantially vertical position, connecting means interconnecting adjacent panels at adjacent ends thereof for relative movement, pulley assembly means mounted at the adjacent end portions of the thus interconnected adjacent panels, with said pulley assembly means being in part mounted on one of said interconnected panels at its adjacent end and in remaining part being mounted on the other of said interconnected panels at its adjacent end, and cable means operatively associated with said pulley assembly means commonly cooperable therewith to actuate the panels for relative movement.

12. The combination of claim 11 further including jacking means carried by one of said cover panels, said actuating means being operatively connected to said jacking means to actuate the latter and thereby raise said panels before said panels are moved by said actuating means to an open position.

13. A hatch cover system for ship hatchways and the like comprising first and second hatch cover panels, connecting link means pivotally connected at opposite ends of the adjacent ends of said panels for interconnecting the same for relative movement, a plurality of pulley assembly means extending across substantially the entire width of the panels at the interconnected ends thereof, with each of said pulley assembly means comprising a main pulley, an idler pulley and a guide pulley mounted at the adjacently disposed end of each of said first and second panels, an actuating cable passing around each of said pulleys, means for applying tension to said cable, resiliently deformable means interposed between said first and second panels, said resiliently deformable means being depressed during movement of said sections in one direction and operable to assist return movement thereof in the opposite direction, and stabilizing means interconnecting the adjacent ends of said first and second panels and serving to maintain substantially uniform application of force on said panels during movement thereof in response to actuation of said cable.

References Cited by the Examiner

UNITED STATES PATENTS

| | | | |
|---|---|---|---|
| 2,664,947 | 1/1954 | Aarvold | 114—201 X |
| 2,949,091 | 8/1960 | Lovell | 160—188 X |
| 2,980,921 | 4/1961 | Bartolucci | 114—202 X |
| 3,078,075 | 2/1963 | Richter | 254—189 |
| 3,114,346 | 12/1963 | Dohlin | 160—188 X |

FOREIGN PATENTS

| | | |
|---|---|---|
| 84,012 | 12/1957 | Denmark. |
| 1,055,573 | 2/1954 | France. |
| 655,199 | 7/1951 | Great Britain. |

REINALDO P. MACHADO, *Primary Examiner.*

HARRISON R. MOSELEY, *Examiner.*